United States Patent
Hoeger

(10) Patent No.: US 9,822,706 B2
(45) Date of Patent: Nov. 21, 2017

(54) GAS TURBINE SUBASSEMBLY

(71) Applicant: MTU Aero Engines AG, Munich (DE)

(72) Inventor: Martin Hoeger, Erding (DE)

(73) Assignee: MTU AERO ENGINES AG, Munich (DE)

(*) Notice: Subject to any disclaimer, the term of this patent is extended or adjusted under 35 U.S.C. 154(b) by 233 days.

(21) Appl. No.: 14/829,288

(22) Filed: Aug. 18, 2015

(65) Prior Publication Data
US 2016/0061111 A1 Mar. 3, 2016

(30) Foreign Application Priority Data

Aug. 29, 2014 (EP) ..................... 14182761

(51) Int. Cl.
*F01D 25/12* (2006.01)
*F02C 7/18* (2006.01)
*F01D 5/14* (2006.01)
*F01D 25/26* (2006.01)
*F02C 3/04* (2006.01)

(52) U.S. Cl.
CPC ............... *F02C 7/18* (2013.01); *F01D 5/143* (2013.01); *F01D 25/12* (2013.01); *F01D 25/26* (2013.01); *F02C 3/04* (2013.01); *F05D 2220/32* (2013.01); *F05D 2240/35* (2013.01); *F05D 2260/20* (2013.01); *Y02T 50/673* (2013.01)

(58) Field of Classification Search
CPC .......... F01D 25/08; F01D 25/12; F01D 5/143; F01D 25/14; F01D 25/26; F02D 7/18; F02C 3/04; F05D 2220/32; F05D 2240/35; F05D 2260/20; Y02T 50/673
See application file for complete search history.

(56) References Cited

U.S. PATENT DOCUMENTS

| | | | |
|---|---|---|---|
| 9,382,806 B2 * | 7/2016 | Hoeger | F01D 5/143 |
| 2013/0156562 A1 * | 6/2013 | Mahle | F01D 9/00 415/191 |

FOREIGN PATENT DOCUMENTS

| | | |
|---|---|---|
| DE | 102011008812 A1 | 7/2012 |
| EP | 2607625 A1 | 6/2013 |
| WO | 2009019282 A2 | 2/2009 |

* cited by examiner

Primary Examiner — Richard Edgar
(74) Attorney, Agent, or Firm — Barlow, Josephs & Holmes, Ltd.

(57) ABSTRACT

The present invention relates to a subassembly for a gas turbine, in particular a gas turbine aircraft engine, having a turbine casing (11); a midframe (14), which is adjacent downstream to the turbine casing and has a number of support ribs (15) spaced apart in the peripheral direction. The turbine casing and the midframe define a flow duct (33) for a working gas exiting a combustion chamber of the gas turbine, and a cavity, in particular a cooling air duct (19), with an opening on the flow duct side is formed between the turbine casing and the midframe. An edge contour (40) of the opening on the turbine casing side varies along the periphery radially and/or axially.

11 Claims, 1 Drawing Sheet

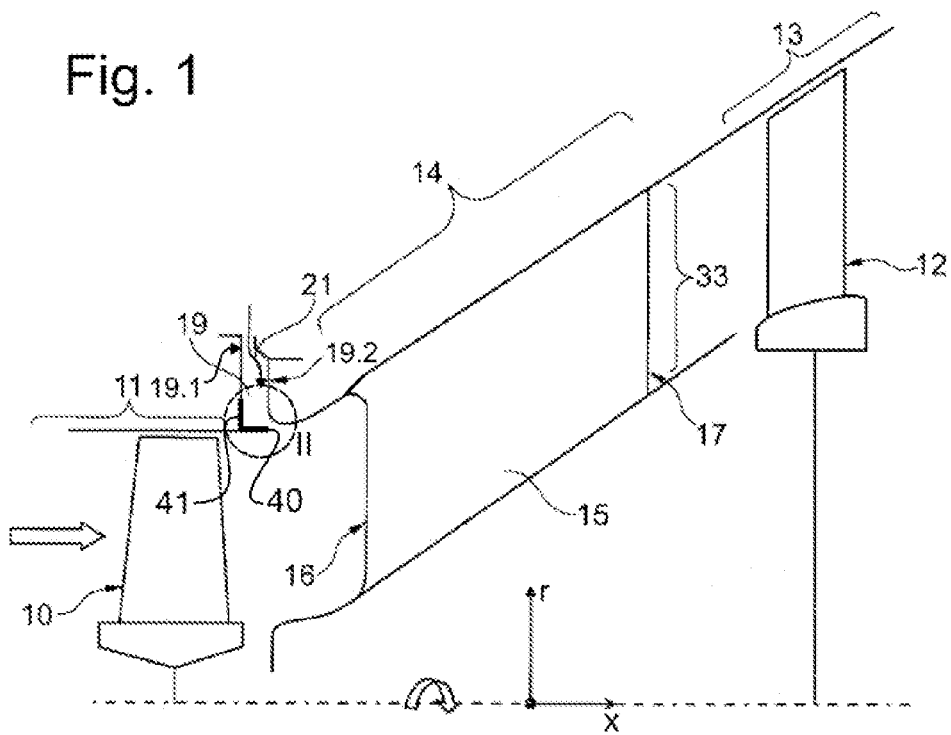
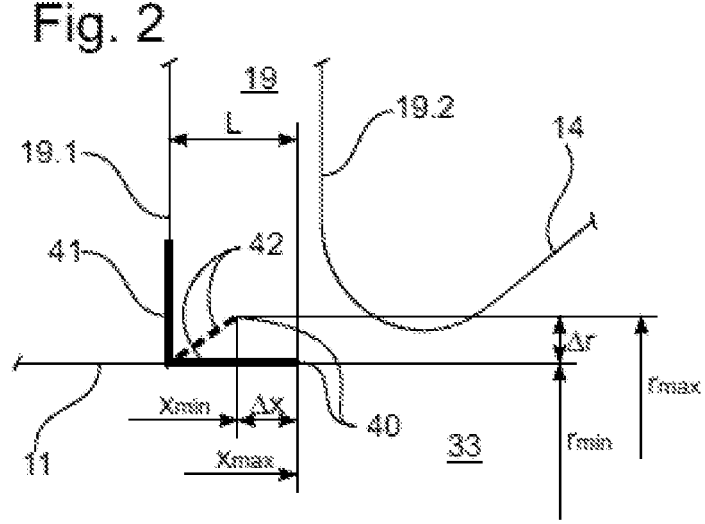

GAS TURBINE SUBASSEMBLY

BACKGROUND OF THE INVENTION

The present invention relates to a subassembly for a gas turbine having a turbine casing and an adjacent intermediate casing or midframe; a gas turbine, in particular a gas turbine aircraft engine, having such a subassembly; and a method for producing such a subassembly.

Known from DE 10 2011 008 812 A1 is a midframe of a gas engine having a radially outer-lying partition wall, which has a contour that varies in the peripheral direction. In this way, any secondary flow in a cavity between the turbine casing and the midframe can be counteracted and thus the efficiency can be improved.

BRIEF SUMMARY OF THE INVENTION

An object of one embodiment of the present invention is to improve the operation and/or the manufacture of a gas turbine.

This object is achieved by a subassembly for a gas turbine having the features of the present invention. The present invention is directed to a gas turbine having a subassembly described herein and to a method for producing a subassembly described here. Advantageous embodiments of the invention are discussed in detail below.

According to an aspect of the present invention, a gas turbine, in particular a gas turbine aircraft engine, has a subassembly described here, which has a turbine casing and an adjacent midframe downstream to the turbine casing as well as another turbine casing, which is adjacent downstream to the midframe. In one embodiment, the one turbine casing is a turbine casing of a high-pressure turbine, which follows downstream from a combustion chamber of the gas turbine, and the other turbine casing is a turbine casing of a low-pressure turbine or an intermediate-pressure turbine, which follows downstream from a low-pressure turbine. In another embodiment, the one turbine casing is a turbine casing of an intermediate-pressure turbine and the other turbine casing is a turbine casing of a low-pressure turbine.

In one embodiment, the turbine casings each have rotors having a plurality of rotor blades that are spaced apart in the peripheral direction, which, in one embodiment, can be, in a generalized way for more compact depiction, a part of the turbine casing. In another embodiment, a turbine casing in the sense of the present invention is only a component that is fixed or stationary relative to the gas turbine or the midframe, without the rotor that is rotatably mounted in it. In an enhancement, a rotor of the turbine casing or a rotor that is rotatably mounted in the turbine casing is coupled to a rotor of a compressor connected upstream of the combustion chamber, and/or a rotor of the other turbine casing or a rotor that is rotatably mounted in the other turbine casing is coupled to a rotor of another compressor connected upstream of the one compressor.

According to an aspect of the present invention, a subassembly for a gas turbine, in particular a subassembly of a gas turbine described here, has a one-part or multiple-part turbine casing and a one-part or multiple-part midframe, which is adjacent downstream from the turbine casing and has a plurality of support ribs spaced apart in the peripheral direction.

The turbine casing and the midframe define a flow duct for a working gas exiting a combustion chamber of the gas turbine. For this purpose, in one embodiment, the turbine casing has a radially outer and/or a radially inner partition wall, which forms or radially delimits a portion of the flow duct on the side of the turbine casing. A radially inner partition wall of the turbine casing can be formed, in particular, by a hub that is preferably fixed or stationary relative to the gas turbine or the midframe or by a rotatably mounted rotor, in particular an inner shroud of a rotor blade cascade or of rotating blades of the rotor. Additionally or alternatively, the midframe has a radially inner partition wall and a radially outer partition wall, which form or radially delimit a portion of the flow duct on the side of the midframe. In an enhancement, the support ribs are or will be designed to be detachably or permanently fastened, preferably cohesively, in particular integrally with the radially inner and/or outer partition wall(s) of the midframe. In one embodiment, the support ribs each have an upstream front edge, which, in particular, is straight or is inclined, in particular curved, in the peripheral and/or axial direction, and a downstream rear edge, as well as two side walls, which are opposite each other and join these edges and, in one embodiment, are, in particular, convexly arched toward the flow duct in which they are arranged.

A cavity is formed between the turbine casing and the midframe. In one embodiment, this cavity is arranged radially outside of the flow duct. Additionally or alternatively, it can also be arranged radially inside of the flow duct. In one embodiment, the cavity is or forms a cooling air duct, which, in an enhancement, communicates with or is connected to a cooling air supply of the gas turbine, and/or is provided or equipped for feeding cooling air into the flow duct. In one embodiment, the cavity has a face on the turbine casing side, which, in an enhancement, will be or is formed by an axial face of the turbine casing that faces the midframe, and a face on the midframe side, which, in an enhancement, will be or is formed by an axial face of the midframe that faces the turbine casing, and is or will be delimited axially by them, with the two faces of the cavity being spaced apart axially from each other, in particular in order to form a radial gap, preferably the cooling air duct.

The cavity has an opening on the side of the flow duct, which, in one embodiment, communicates with the flow duct or is provided or equipped for this purpose, in particular for blowing cooling air into the flow duct. In addition, the cavity also serves for the purpose of permitting different thermal expansions between the regions that are separated from one another by the cavity.

This opening on the flow duct side has an edge contour that faces the turbine casing or is on the side of the turbine casing, which, in particular, is continuous in the peripheral direction, and an edge contour that faces the midframe or is on the side of the midframe, which, in particular, is spaced apart from it axially and/or radially and is continuous in the peripheral direction.

In the initially mentioned DE 10 2011 008 812 A1, to which supplemental reference is made and the content of which is incorporated in full into the present disclosure, it is proposed that this edge contour on the side of the midframe varies along the periphery. According to an aspect of the present invention, it is now suggested that, additionally or alternatively, the edge contour of the opening on the turbine casing side varies radially and/or axially along the periphery.

As explained in DE 10 2011 008 812 A1, any blocking of the flow upstream of the support ribs of the midframe lead to pressure fluctuations or a secondary flow in the cavity. Surprisingly, it has been found that this can advantageously be counteracted by a peripheral contouring of the edge contour on the turbine casing side, even though the blocking front edges of the support ribs are generally arranged axially downstream of an inlet duct of the flow duct portion on the midframe side.

In one embodiment, the edge contour on the turbine casing side varies continuously along the periphery or in a bend-free manner in the peripheral direction, in particular in a meandering, preferably sinusoidal manner. In another embodiment, the edge contour can also change discontinuously along the periphery and, in particular, have bends or edges in the peripheral direction, which preferably have a sawtooth-shaped or trapezoidal design.

In particular, when, instead of the edge contour on the midframe side, the edge contour of the opening on the turbine casing side varies along the periphery, a radially outer and/or radially inner partition wall of the midframe, which delimits the flow duct or the flow duct portion on the midframe side radially outward or inward, at least in one axial portion facing the turbine casing, in particular at least one inlet edge of the partition wall or, of the flow duct portion on the midframe side, can be or can become designed to be radially and/or axially rotationally symmetric. This can improve the manufacture, assembly, and/or flow properties of the midframe.

In one embodiment, the edge contour on the side of the turbine casing, which varies in the peripheral direction or along the periphery, can be or can become formed on the turbine casing itself or can be or can become integral with it, in particular at an outlet edge of a radially outer and/or inner partition wall of the turbine casing, which delimits radially outward or inward the flow duct or the flow duct portion on the turbine casing side. For this purpose, in one embodiment, the partition wall or outlet edge can be correspondingly primarily shaped, in particular cast, and/or, in particular, can become or can be machined.

In another embodiment, the edge contour on the turbine casing side is or will be formed on a flange, which will be or is joined to the turbine casing, in particular, detachably, preferably in a friction-fitting manner, or permanently, preferably in a cohesive manner, in particular by welding or soldering. In one embodiment, the flange is or will be produced separately from the turbine casing and then joined to it. In particular, it can be a sheet metal molded part, which, in an enhancement, is curved in the peripheral direction. In one embodiment, the flange has two arms, which are inclined with respect to each other, in particular by at least 60° and/or at most 120°, in particular a first arm, which extends, at least substantially, in the radial direction and will be or is joined to the turbine casing, and a second arm, which extends, at least substantially, in the axial direction and therefore is referred to as an axial arm, and on the axial face of which, facing away from the turbine casing, the edge contour on the turbine casing side will be or is formed. For this purpose, in one embodiment, the flange or arm can correspondingly be primarily shaped, reshaped, and/or, in particular, will become or will be machined.

In particular, in one embodiment, when the edge contour on the turbine casing side is formed or will be formed on a separately produced flange that is joined to the turbine casing, a radial outer and/or radial inner partition wall of the turbine casing, which delimits radially outward or inward the flow duct or the flow duct portion on the turbine casing side, at least in an axial portion facing the midframe, in particular at least an outlet edge of the partition wall or the flow duct portion of the turbine casing side, can be or can become designed radially and/or axially rotationally symmetric. This can improve the manufacture, assembly, and/or flow properties of the turbine casing.

According to an aspect of the present invention, the edge contour on the turbine casing side varies along the periphery or in the peripheral direction periodically with a division of the support ribs or the distribution thereof in the peripheral direction. In particular, maximum and/or minimum axial and/or radial extents of the edge contour on the turbine casing side can be distributed periodically along the periphery, with a period corresponding to a division or period of the support ribs (support rib distribution).

A peripheral region, to which reference will be made below, extends between a peripheral position of an upstream front edge of a support rib and a peripheral position of an upstream front edge of an adjacent support rib in the peripheral direction. Correspondingly, the front edges of these two support ribs exhibit a separation, to which reference will also be made below.

According to an aspect, the edge contour on the turbine casing side has, in one or a plurality of, preferably all, such peripheral regions, a first axial extent downstream and/or a first radial extent directed away from the flow duct at a first peripheral position, which is spaced apart from the peripheral position of the front edge of the one support rib by at most 20%, in particular at most 10%, preferably at most 5% of the distance between the peripheral positions of the front edges of the two support ribs; and a second axial extent downstream and/or a second radial extent directed away from the flow duct at a second peripheral position between the two support ribs, which is spaced apart from the peripheral positions of the front edges of the two support ribs in each case by at least 30%, in particular at least 40%, preferably at least 45% of the distance between the peripheral positions of the front edges of the two support ribs.

In an enhancement, the first peripheral position is located correspondingly, at least substantially, upstream of a support rib or of the peripheral position of its front edge and, in an enhancement, the second peripheral position is located correspondingly, at least substantially, in the middle between two adjacent support ribs or in the peripheral direction at the level of a half division between two adjacent support ribs.

An axial extent downstream is understood in the present case to mean, in particular, an axial position of the edge contour on the turbine casing side at the first or second peripheral position, with a greater axial extent downstream corresponding to an axial position further downstream, in particular directed away from the turbine casing and/or toward the midframe.

A radial extent directed away from the flow duct is understood in the present case to mean, in particular, a radial position of the edge contour on the turbine casing side at the first or second peripheral position, wherein a greater radial extent of a radially outer edge contour or of the edge contour on the turbine casing side of a cavity, which is arranged or is formed radially outward of the flow duct, directed away from the flow duct corresponds to a greater radial distance from the axis of rotation of the gas turbine, while a greater radial extent of a radially inner edge contour or of the edge contour on the turbine casing side of a cavity, which is arranged or formed radially inward from the flow duct, directed away from the flow duct corresponds to a smaller radial distance from the axis of rotation.

According to an aspect of the present invention, the first axial extent is greater than the second axial extent and, in an enhancement, the first axial extent is a maximum axial extent and/or the second axial extent is a minimum axial extent downstream within the peripheral region.

In particular, therefore, in one embodiment, the edge contour on the turbine casing side can have, at least substantially, upstream of one or a plurality of, in particular all, support ribs, a respective maximum axial extent or axial position downstream. Additionally or alternatively, the edge contour can have, at least substantially, in the middle between one or a plurality of, in particular all, pairs of adjacent support ribs or in the peripheral direction at the level of a half division, a respective minimum axial extent or axial position downstream.

Additionally or alternatively, according to an aspect of the present invention, the first radial extent directed away from the flow duct is smaller than the second radial extent directed away from the flow duct and, in an enhancement, the first radial extent is a minimum radial extent and/or the second radial extent is a maximum radial extent directed away from the flow duct within the peripheral region.

In particular, therefore, in one embodiment, the radial outer edge contour on the turbine casing side can have, at least substantially, upstream of one or a plurality of, in particular all, support ribs a minimum radial extent directed away from the flow duct or a minimum radial distance from an axis of rotation of the gas turbine in each case. Additionally or alternatively, the radial outer edge contour can have, at least substantially, in the middle between one or a plurality of, in particular all, pairs of adjacent support ribs or in the peripheral direction at the level of a half division, a maximum radial extent directed away from the flow duct or a maximum radial distance from the axis of rotation of the gas turbine.

Correspondingly, in one embodiment, a radially inner edge contour on the turbine casing side can have, at least substantially, upstream of one or a plurality of, in particular all, support ribs, a minimum radial extent directed away from the flow duct or a maximum radial distance from an axis of rotation of the gas turbine. Additionally or alternatively, the radial inner edge contour can have, at least substantially, in the middle between one or a plurality of, in particular all, pairs of adjacent support ribs or in the peripheral direction at the level of a half division, a respective maximum radial extent directed away from the flow duct or a minimum radial distance from the axis of rotation of the gas turbine.

In one embodiment, in one or a plurality of, in particular all, peripheral regions between a peripheral position of an upstream front edge of one support rib and a peripheral position of an upstream front edge of an adjacent support rib in the peripheral direction, a quotient $\Delta x/L$ of or a ratio between a difference $\Delta x=|x_{max}-x_{min}|$ between a maximum axial extent $x_{max}$ and a minimum axial extent $x_{min}$ of the edge contour downstream divided by a maximum axial distance of the edge contour from a face of the cavity on the turbine casing side, in particular divided by a maximum axial length L of an axial arm of a separate flange joined to the turbine casing, on which the edge contour is formed, is at least 0.02, in particular at least 0.2, preferably at least 0.4. Additionally or alternatively, in one embodiment, this quotient or this ratio is at most 0.8, in particular at most 0.6.

Alternatively, in the aforementioned equation, it is also possible to use a value for the axial length L that corresponds substantially to $2 \times \Delta x_{cav}$, where $\Delta x_{cav}$ is the minimum axial gap between the front wall of the cavity on the turbine casing and midframe side in the hot operating state (permanent operation) of the engine.

In one embodiment, in one or a plurality of, in particular all, peripheral regions between a peripheral position of an upstream front edge of one support rib and a peripheral position of an upstream front edge of an adjacent support rib in the peripheral direction, a quotient $\Delta r/L$ of or a ratio between a difference $\Delta r=|r_{max}-r_{min}|$ between a maximum radial extent $r_{max}$ and a minimum axial extent $r_{min}$ of the edge contour directed away from the flow duct divided by the maximum axial distance of the edge contour from a face of the cavity on the turbine casing side, in particular divided by the maximum axial length L of an axial arm of the separate flange joined to the turbine casing, on which the edge contour is formed, is at least 0.02, in particular at least 0.1. Additionally or alternatively, in one embodiment, this quotient or this ratio is at most 0.4, in particular at most 0.3.

Another aspect of the present invention relates to a method for producing a subassembly described here, wherein an edge contour on the turbine casing side, described here, is formed.

BRIEF DESCRIPTION OF THE DRAWING FIGURES

Additional advantageous enhancements of the present invention ensue from the dependent claims and the following description of preferred embodiments. Shown for this purpose in partially schematic form are:

FIG. 1 two superimposed meridian sections of a subassembly of a gas turbine according to an embodiment of the present invention; and FIG. 2 a detail, identified in FIG. 1 by "II," in enlarged detail.

DETAILED DESCRIPTION OF THE INVENTION

FIG. 1 shows, in a way corresponding to DE 10 2011 008 812 A1, two superimposed meridian sections of a subassembly of a gas turbine according to an embodiment of the present invention, having a turbine casing of a high- or intermediate-pressure turbine, which has a radially outer partition wall 11 and, in one embodiment, a rotor having a plurality of rotor blades 10 spaced apart in the peripheral direction, and having a midframe, which is adjacent downstream to the turbine casing (right in FIG. 1), which has a radially outer partition wall 14 and support ribs 15, which are designed to be integral with the radially outer partition wall 14 of the midframe, and each of which has an upstream front edge 16 and a downstream rear edge 17, as well as another turbine casing of an intermediate- or low-pressure turbine of the gas turbine, which is adjacent downstream to the midframe and has a radially outer partition wall 13 and, in one embodiment, a rotor having a plurality of rotor blades 12 spaced apart in the peripheral direction.

In the exemplary embodiment, the rotors are identified, in a generalized way for more compact depiction, as a part of the turbine casing. Equally, a turbine casing in the sense of the present invention can also be the component that is fixed or stationary relative to the gas turbine or to the midframe, in particular the radially outer partition wall 11 or 13, without the rotor mounted rotatably in it.

The turbine casing and the midframe define a flow duct 33 for a working gas exiting a combustion chamber of the gas turbine, which is indicated in FIG. 1 on the left by a horizontal arrow in the flow or axial direction. This is radially delimited or formed radially outward by the radially outer partition walls 11, 13, and 14 or the turbine casing and the midframe.

Formed between the turbine casing with the partition wall 11 and the midframe with the partition wall 14 is a cavity 19, which is arranged radially outward of the flow duct 33 and forms a cooling air duct, which communicates with a cooling air supply of the gas turbine and is provided or equipped for feeding cooling air 21 into the flow duct 33 and permitting thermal expansion. The cavity 19 has a face 19.1 on the turbine casing side, which is formed by an axial face of the turbine casing that faces the midframe, and a face 19.2 on the midframe side, which is formed by an axial face of the midframe that faces the turbine casing, wherein the two faces 19.1, 19.2 of the cavity 19 are spaced apart from each other in order to form the cooling air duct.

FIG. 2 shows a detail, identified in FIG. 1 by "II," in an enlarged view. As can be seen here in particular, the cavity has an opening on the flow duct side with an edge contour 40 on the turbine casing side.

The latter is formed on a flange that is produced separately from the turbine casing as a sheet metal shaped part and joined to the turbine casing. The flange has a first arm 41, which extends substantially in the radial direction r and is joined to the turbine casing, and a second or axial arm 42, which extends substantially in the axial direction x and is inclined with respect to the first arm by about 90° and on the axial face (right in FIG. 1) of which, facing away from the turbine casing, the edge contour on the turbine casing side, 40, is formed.

A rounded inlet edge (left in FIG. 1) of the radially outer partition wall 14 of the midframe as well as an outlet edge (right in FIG. 1) of the radially outer partition wall 11 of the turbine casing are designed to be radially and axially rotationally symmetric.

In FIGS. 1, 2, two meridian sections are depicted superimposed. In this case, one section, illustrated as a solid or unbroken line, is a meridian section in a first peripheral position, which lies opposite an upstream front edge 16 of an arbitrary support rib 15, with this meridian section being identical for all support strips.

A section illustrated as a dashed line, by contrast, is a meridian section in a second peripheral position between an arbitrary pair of two support ribs that are adjacent in the peripheral direction, with this position being spaced apart from the respective peripheral positions of the front edges of the two support ribs by 50% of the distance in the peripheral direction between the peripheral positions of these front edges, wherein this meridian section also is identical for all middles between support ribs that are adjacent in the peripheral direction. The following statements apply therefore to all peripheral regions between two respective support ribs 15 that are adjacent in the peripheral direction.

The first peripheral position or the meridian section illustrated solid in FIGS. 1, 2 is located correspondingly upstream of a support rib or of the peripheral position of its front edge, while the second peripheral position or the meridian section illustrated by the dashed line in FIGS. 1, 2 is located correspondingly in the middle between two adjacent support ribs or in the peripheral direction at the level of a half division between two adjacent support ribs.

As indicated in FIG. 2, in particular, the edge contour 40 in the first peripheral position (solid line in FIG. 2) has a maximum axial extent downstream, $x_{max}$, and in the second peripheral position (dashed line in FIG. 2) has a minimum axial extent downstream, $x_{min}$, wherein a difference $\Delta x=|x_{max}-x_{min}|$ between the maximum and minimum axial extent is also drawn in.

As also indicated in FIG. 2, the radial outer edge contour 40 in the first peripheral position (solid line in FIG. 2) has a minimum radial extent directed away from the flow duct or a minimum radial distance from the axis of rotation of the gas turbine, $r_{min}$, and in the second peripheral position (dashed line in FIG. 2) has a maximum radial extent directed away from the flow duct or a maximum radial distance from the axis of rotation of the gas turbine, $r_{max}$, wherein a difference $\Delta r=|r_{max}-r_{min}|$ between the maximum and minimum radial extents is also drawn in.

The maximum axial length of the axial arm 42 is identified by L, which, at the same time, represents the maximum axial distance of the edge contour 40 from the face 19.1 of the cavity 19 on the turbine casing side.

In the embodiment, the quotient $\Delta x/L=0.5$ and the quotient $\Delta r/L=0.2$.

Between the maximum and minimum axial and radial extents, the edge contour 40 on the turbine casing side varies along the periphery or in the peripheral direction continuously or in a bend-free manner, preferably in a meandering, in particular sinusoidal manner.

As stated above, the preceding explanations apply to all peripheral regions between two respective support ribs 15 that are adjacent in the peripheral direction. The radially outer edge contour 40 on the turbine casing side thus varies along the periphery or in the peripheral direction periodically with the division of the support ribs 15, wherein the edge contour has, on a respective first peripheral position upstream of a front edge of a support rib, a maximum axial extent or axial position, $x_{max}$, downstream and a minimum radial extent directed away from the flow duct, or a minimum radial distance from an axis of rotation of the gas turbine, $r_{min}$. At each second peripheral position in the middle between a pair of adjacent support ribs or in the peripheral direction at the level of a half division, the edge contour 40 has, by contrast, a minimum axial extent or axial position, $x_{min}$, downstream and a maximum radial extent directed away from the flow duct, or a maximum radial distance from an axis of rotation of the gas turbine, $r_{max}$. The ratio between these extents is determined by the above-given quotients $\Delta x/L$ and $\Delta r/L$, respectively.

Although, in the preceding description, exemplary embodiments were explained, it is noted that a large number of modifications are possible. Moreover, it is noted that the exemplary embodiments are merely examples, which are not intended to limit the protective scope, the applications, and the construction in any way. Instead, the preceding description provides the person skilled in the art with a guideline for implementing at least one exemplary embodiment, with it being possible to make diverse modifications, in particular in regard to the function and arrangement of the described components, without departing from the protective scope, as ensues from the claims and combinations of features equivalent to these.

What is claimed is:

1. A subassembly for a gas turbine, comprising:
a turbine casing;
a midframe, which is adjacent downstream to the turbine casing and has a plurality of support ribs spaced apart in the peripheral direction;
wherein the turbine casing and the midframe define a flow duct for a working gas exiting a combustion chamber of the gas turbine, and wherein a cooling air duct, with an opening on the flow duct side, is formed between the turbine casing and the midframe;
wherein an edge contour of the opening on the turbine casing side varies along the periphery radially and/or axially; and
wherein the edge contour is formed on a separate, two-arm, flange joined to the turbine casing.

2. The subassembly according to claim 1, wherein a partition wall of the turbine casing, which delimits the flow duct radially, has an outlet edge, which is radially and/or axially rotationally symmetric.

3. The subassembly according to claim 1, wherein the edge contour is formed on the turbine casing.

4. The subassembly according to claim 1, wherein a partition wall of the midframe, which delimits the flow duct radially, has an inlet edge, which is radially and/or axially rotationally symmetric.

5. The subassembly according to claim 1, wherein, in at least one peripheral region between a peripheral position of an upstream front edge of one support rib and a peripheral position of an upstream front edge of a support rib that is adjacent in the peripheral direction, the edge contour at a first peripheral position, which is spaced apart from the peripheral position of the front edge of the one support rib by at most 20% of the distance between the peripheral positions of the front edges of the two support ribs, has a first axial extent downstream ($x_{max}$) and, at a second peripheral position between the two support ribs, which is spaced apart from the peripheral position of the front edges of the two support ribs in each case by at least 30% of the distance between the peripheral positions of the front edges of the two support ribs, has a second axial extent downstream ($x_{min}$), wherein the first axial extent is greater than the second axial extent and, in particular, the first axial extent is a maximum axial extent ($x_{max}\neg$) and/or the second axial extent is a minimum axial extent ($x\neg_{min}$) downstream within the peripheral region.

6. The subassembly according to claim 1, wherein, in at least one peripheral region between a peripheral position of an upstream front edge of a support rib and a peripheral position of an upstream front edge of one support rib that is adjacent in the peripheral direction, the edge contour at a first peripheral position, which is spaced apart from the peripheral position of the front edge of the one support rib by at most 20% of the distance between the peripheral positions of the front edges of the two support ribs, has a first radial extent directed away from the flow duct ($r_{min}$) and, at a second peripheral position between the two support ribs, which is spaced apart from the peripheral positions of the front edges of the two support ribs in each case by at least 30% of the distance between the peripheral positions of the front edges of the two support ribs, has a second radial extent directed away from the flow duct ($r_{max}$), wherein the first radial extent is smaller than the second radial extent and, in particular, the first radial extent is a minimum radial extent ($r_{min}\neg$) and/or the second radial extent is a maximum radial extent ($r\neg_{max}$) directed away from the flow duct within the peripheral region.

7. The subassembly according to claim 1, wherein, in at least one peripheral region between a peripheral position of an upstream front edge of one support rib and a peripheral position of an upstream front edge of an adjacent support rib in the peripheral direction, a quotient ($\Delta x/L$) of a difference ($\Delta x$) between a maximum axial extent and a minimum axial extent ($x_{max}$, $x_{min}$) of the edge contour downstream divided by a maximum axial distance of the edge contour from a face of the cooling air duct on the turbine casing side, in particular divided by a maximum axial length (L) of an axial arm of a separate flange joined to the turbine casing, on which the edge contour is formed, is at least 0.02 and/or at most 0.8.

8. The subassembly according to claim 1, wherein, in at least one peripheral region between a peripheral position of an upstream front edge of one support rib and a peripheral position of an upstream front edge of an adjacent support rib in the peripheral direction, a quotient ($\Delta r/L$) of a difference ($\Delta r$) between a maximum radial extent and a minimum radial extent ($r_{max}$, $r_{min}$) of the edge contour directed away from the flow duct divided by a maximum axial distance of the edge contour from a face of the cooling air duct on the turbine casing side, in particular divided by a maximum axial length of an axial arm of a separate flange joined to the turbine casing, on which the edge contour is formed, is at least 0.02 and/or at most 0.4.

9. The subassembly according to claim 1, further comprising another turbine casing, which is adjacent downstream to the midframe and being in a gas turbine.

10. The subassembly according to claim 9, wherein the cooling air duct communicates with a cooling air supply.

11. The subassembly according to claim 1, wherein the edge contour of the opening varies radially and/or axially along the periphery of the midframe.

* * * * *